United States Patent Office 3,474,158
Patented Oct. 21, 1969

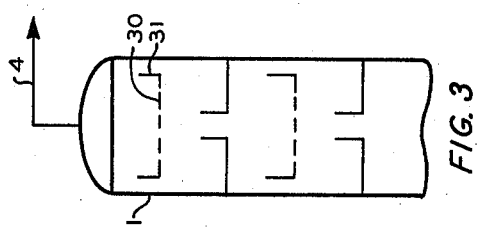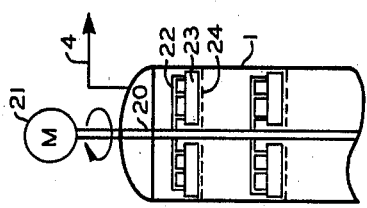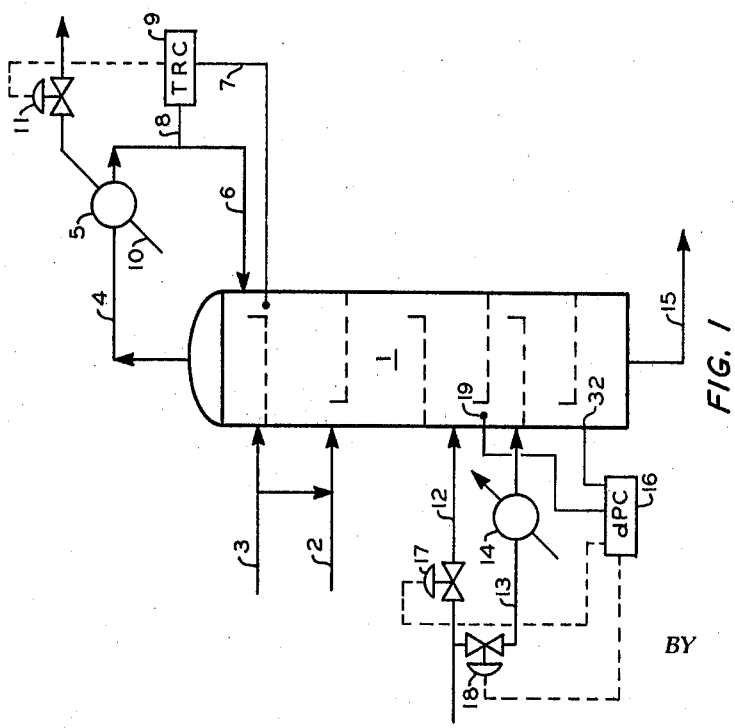

3,474,158
CONTINUOUS BLOCK COPOLYMER PRODUCTION
Jack S. Scoggin, Bartlesville, Okla., assignor to Phillips Petroleum Company, a corporation of Delaware
Filed Mar. 17, 1966, Ser. No. 535,150
Int. Cl. C08f *15/04, 1/96, 27/00*
U.S. Cl. 260—878
8 Claims

ABSTRACT OF THE DISCLOSURE

A first monomer is added to the upper portion of a single reaction zone and polymerized therein. The resulting polymer is passed downward through an intermediate zone containing no monomer into a lower zone into which a second monomer is introduced; a block copolymer is thereby formed.

---

This invention relates to the continuous production of block copolymers. In one of its aspects, it relates to a process for the continuous copolymerization in block form of olefin monomers, the process comprising passing a first olefin to a first reaction zone operated under polymerization conditions, passing a second monomer to a second reaction zone under conditions such that there occurs therein polymerization of the second monomer onto polymers formed in the first reaction zone, the reaction zones being operated so that the polymers produced in the first zone move to the second zone as they are polymerized. In another of its aspects, the invention relates to a continuous process for copolymerizing monomers as hereinbefore described wherein the heat of reaction in the first reaction zone is controlled by removing a gaseous fraction, cooling and at least partially condensing it, and recycling it to the first zone. In still a further aspect, the invention relates to a process for copolymerizing monomers as hereinbefore described wherein the heat of reaction in the second zone is controlled by adding a controlled amount of a liquid vaporizable monomer to the second zone. In a still further aspect, the invention relates to a process for copolymerizing monomers as hereinbefore described wherein the block copolymer is continuously removed from the lower portion of the second zone. In a still further aspect, the invention relates to a process for copolymerizing monomers as hereinbefore described wherein the second zone is positioned below the first zone and the second zone is maintained at a temperature higher than that of the first zone. In another of its aspects, the invention relates to a process for copolymerizing monomers to block copolymers, the polymerization being carried out in a fractional distillation zone in which the trays can be continuously stirred. In a still further aspect, the invention relates to a continuous process for copolymerizing monomers into block copolymers in a fractional distillation zone in which the polymers move downward through the zone in an inert hydrocarbon diluent.

The invention also relates to an apparatus for continuously producing block copolymers comprising a fractional distillation zone, a centralized stirring shaft having a plurality of arms which continuously wipe trays in the fractional distillation zone to keep polymer from accumulating on the trays. In a still further aspect, the invention relates to an apparatus for continuously producing block copolymers from olefin monomers, the apparatus comprising the fractional distillation zone containing a plurality of fractionator trays being open at the periphery thereof, the fractionator trays having a means to maintain liquid moving downwardly along the wall of the apparatus, thereby keeping said walls clean of polymer.

It is known that mono-1-olefins can be polymerized sequentially in such a manner that the polymer molecules contain distinct polymer segments or blocks which are non-identical and which contribute significantly to the properties of the total polymer. The preparation of block copolymers is described in British patent specification No. 889,659 of Phillips Petroleum Company. One type of polymer which can be made in accordance with the procedure described is a polymer in which each block is made up essentially of only one type of monomer. In this case the polymerization of each monomer is carried out in the substantial absence of a different monomer. It has been found that very valuable properties can be obtained by copolymerizing mono-1-olefins in this manner and that similar results cannot be realized by making physical blends of different homopolymers based on the same monomers and combined in the same proportions. For example, block copolymers of ethylene and propylene can be prepared so that the polymer molecules contain a polyethylene block and a polypropylene block. This product has much better impact strength and low temperature properties than does a physical blend of polyethylene and polypropylene of the same proportions of ethylene and propylene.

Although block coolymers of the type described above can be readily prepared on a laboratory scale, in continuous commercial operations, many problems are involved which are not present in conventional processes directed to the formation of homopolymers or random copolymers of the same monomers. One of the difficulties lies in obtaining complete removal of unreacted monomer or consumption of all of the monomer which is used first so that it will not be present in the system when the second monomer is polymerized. Another very critical problem is that of maintaining the first polymer and the catalyst associated therewith in an active state so that when the second monomer is polymerized, the second block is added to the molecules of the first polymer. If the first polymer is inactivated during the procedure in which the monomers are being changed, the result obtained is merely a physical blend of independent homopolymer molecules so that the advantages of block copolymerization as discussed above are not realized. On a laboratory scale these difficulties can easily be overcome by using the same polymerization catalyst and diluent for the polymerization of both monomers, the first monomer being either completely consumed or any unreacted monomer being removed from the polymerization mixture by vaporization. On a commercial scale, however, carrying out the first polymerization to completion may require an unduly long residence time. Also, the complete removal of monomer by vaporization, even where an inert gas is used for stripping purposes, is an expensive and time-consuming operation.

I have now discovered that block copolymers can be produced continuously by carrying out the polymerization in a single reactor. Lighter monomers are polymerized in an upper portion of the reactor and as they are polymerized, they move through a zone containing diluent and substantially no monomer to the lower portion of the reactor where a second heavier monomer is introduced and polymerized onto the first polymer. Suitable reaction vessels resemble fractionator columns wherein there is a temperature and concentration gradient from the bottom to the top of the column.

By various aspects of this invention, one or more of the following, or other, objects can be obtained.

It is an object of this invention to provide a process for producing block copolymers in a single reactor.

It is a further object of this invention to provide a process for continuously block copolymerizing two different monomers avoiding the expense of removing diluent and catalyst from the polymer after the polymerization of the first monomer.

It is a still further object of this invention to provide a continuous method of copolymerizing a block copolymer of ethylene and propylene.

It is a still further object of this invention to provide an apparatus for block copolymerizing two olefins of different molecular weight.

Other aspects, objects and the several advantages of this invention are apparent to one skilled in the art from a study of this disclosure, the drawings and the appended claims.

According to the invention, a polymerizable monomer such as an olefin and a suitable hydrocarbon diluent of lower vapor pressure are passed to the upper portion of a reaction zone in the presence of a suitable catalyst. As the polymerization takes place, the polymer and catalyst move downward through a zone containing diluent and substantially no monomer to the lower portion of the reaction zone wherein it contacts a second monomer capable of being polymerized onto the polymer formed in the first zone. The conditions in the lower portion of the reaction zone are favorable for the formation of a polymer formed by the addition of the second monomer onto the polymer. As the polymer becomes more concentrated, it flows by gravity to the bottom of the reaction zone wherein it is removed.

The invention is particulary applicable to the production of an ethylene-propylene block copolymer wherein ethylene and ethane are fed to the upper portion of the reaction zone and therein polymerized and propylene is polymerized onto the ethylene polymer in the lower portion of the reaction zone.

In one embodiment, the invention is carried out in a fractional distillation zone wherein ethylene, ethane, and the catalyst are passed to the upper portion of the fractional distillation zone and therein polymerized, overhead vapors are removed, cooled, and recycled to the upper portion of the distillation zone to control the temperature in the upper portion of the fractional distillation zone. The polymer moves down the distillation column through a zone containing substantially all ethane and no monomer and is further polymerized in the second reaction zone by contacting propylene under conditions such that propylene will add to the ethylene polymer. The heat of reaction in the bottom portion of the distillation zone is controlled by adding liquid propylene thereto.

Since a wide variety of catalyst systems can be employed in the polymerization, it is not intended to limit the invention to any particlar catalyst system. Catalyst systems suitable for use in the polymerization are those which are capable of polymerizing a mono-1-olefin in a mass polymerization system and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, n is from 1 to 3, inclusive, m is from zero to 2, inclusive, and the sum of m and n is equal to the valence of the metal M, and (b) a halide of a metal of Group IV-B, V-B, VI-B or VIII as presented in Handbook of Chemistry and Physics, Chemical Rubber Company, 45th edition, 1964, page B-2. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydrode, $CH_3AlCl_2, (CH_3)_2AlCl, C_2H_5AlCl_2, (C_2H_5)_2AlCl,$ $(C_4H_9)_2AlBr$ $CH_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$ $(C_{14}H_{29})_2GaF$, $(C_6H_5)_2InCl$ (benzene derivative), $C_8H_{17}InF_2$ $(C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like. Mixtures of these materials, such as a mixture of diethylaluminum chloride and ethylaluminum dichloride, etc., can also be employed.

The metal halide component of the catalyst system is preferably a halide of a Group IV-B metal, in abovementioned reference, i.e., titanium, zirconium, hafnium and germanium. The trichlorides, trifluorides, tribromides, and triiodides, as well as the tetrachloride, tetrafluorides, tetrabromides and tetraiodides of the Group IV-B metals, can be used in the catalyst system, either individually or as mixtures of two or more of the metal halides. It is usually preferred to employ a trichloride, such as titanium trichloride, in the polymerization. However, it is to be understood that halides of metals of the other groups specified above, such as vanadium, molybdenum, tungsten, cobalt, and iron can also be employed in the catalyst system.

The preferred catalyst system employed in the polymerization comprises a dialkylaluminum chloride, such as diethylaluminum chloride, and titanium trichloride, the latter compound preferably being prepared by reduction of titanium tetrachloride in the presence of aluminum. The reduction product is preferably a complex having the approximate formula $3TiCl_3 \cdot AlCl_3$. The reduction reaction is usually carried out at an elevated temperature, for example, at a temperature in the range of 360 to 600° F., preferably from 375 to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols/mol. When employing the preferred catalyst system, the mol ratio of the dialkylaluminum halide to the titanium trichloride complex usually ranges from 1.0:0.02 to 1.0:50.0, preferably 1.0:0.1 to 1.0:10.0. The amount of the dialkylaluminum halide used is at least $1.0 \times 10^{-4}$ gm./gm. of monomer and can be as much as $25 \times 10^{-4}$ gm./gm. of monomer. The amount of titanium trichloride employed is generally in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.03 to 1.0 mol percent hydrogen in the liquid mono-1-olefin phase in the polymerization zone.

Although pressure ranging from atmospheric up to 5000 p.s.i.g. can be used, a pressure in the range of 100 to 1000 p.s.i.g. is ordinarily preferred.

The temperature of the reaction can vary. Generally, the reactions will be carried out under the following conditions.

|  | Upper Portion | Lower Portion |
|---|---|---|
| Temperature, °F | −10 | 130 |
| Pressure, p.s.i.a | 330 | 335 |

In another embodiment, the invention relates to an apparatus for continuously producing a block copolymer. The apparatus comprises a fractionation type reactor vessel wherein there is provided the means to control the temperature at the top of the fractionator, means to control the temperature at the bottom of the fractionator, and means to keep the polymers from accumulating on the fractionator trays.

The invention can be exemplified by reference to the accompanying drawing in which FIGURE 1 schematically shows the invention as applied to a fractional distillation column; FIGURE 2 is a partial section through a fractionator showing the means to prevent polymer from accumulating on the fractionator trays; and FIGURE 3 is a modification of the apparatus of the invention showing the means to keep the polymer moving down the column.

Referring now specifically to the drawing, which will be described with relation to a process for making an ethylene-propylene block copolymer, a fractional distillation column 1 has fed to the upper portion thereof ethylene and ethane through line 2 and catalyst through line 3. The catalyst can be admixed with the ethylene before entering the column 1. The conditions are such in the top portion of this column that ethylene will polymerize. Unpolymerized monomer, ethane, and lighter products are removed overhead as a gaseous stream through line 4, cooled and condensed in cooler 5 and returned to the fractionator through line 6. The cooling and condensation which takes place in cooler 5 removes heat of reaction in the upper portion of the fractionator. The temperature is sensed in the upper portion of the fractionator and a signal passed through line 7 to the temperature recorder controller 9. According to a predetermined temperature, the pressure of boiling coolant supplied to cooler 5, through line 10, is regulated by valve 11 in accordance with the signal sent through line 7 to temperature recorder controller 9. Alternately, the temperature of the cooled material in line 6 can be sensed and a temperature signal sent through line 8 to temperature recorder controller 9. The pressure and temperature of coolant supplied to cooler 5 through line 10 can accordingly be regulated by temperature controller 9 by simply adjusting valve 11 in accordance with a predetermined temperature sensed in line 6.

As the polymer concentration increases, it moves as a slurry down the column to the lower portion thereof. According to one embodiment of the invention, the temperature increases from the top to the bottom of the fractionator, thus there will be a point as the polymer moves the column wherein there will no longer be any ethylene and the diluent will be essentially pure ethane. Although catalyst moves down the column with the polymer and ethane, no further polymerization will occur due to the fact there is no further monomer. In the lower portion of the column, ethane concentration decreases and the polymer is contacted with propylene entering column 1 through line 12 or through line 13. In the lower portion of the column, the conditions are such that propylene will add onto the ethylene polymer thereby forming a block copolymer. As the copolymer concentration increases, it flows by gravity to the bottom of the column whereby it is removed therefrom through line 15. Thus the upper portion of the column contains essentially ethylene, ethane, catalyst, and polyethylene. The middle portion contains essentially catalyst, polyethylene, and ethane. The lower portion contains essentially copolymer, propylene, ethane, and catalyst.

The temperature in the bottom of the column is controlled by column pressure which in turn is controlled by coolant temperature and pressure in the overhead condensor. Boil-up of propylene can be controlled by controlling the amount of condensed propylene which is fed into the column through line 13. The differential pressure in the bottom portion of the column is measured between 19 and 32 by differential pressure sensing means and a signal representative of the differential pressure is sent to differential pressure recorder controller 16. In accordance with a predetermined differential pressure, the amount of vapor supplied from vaporizer 14 to boil up the propylene can be adjusted by valve 18 and/or the amount of propylene liquid entering the column can be regulated by valve 17.

Referring now to FIGURE 2, an apparatus similar to that shown in FIGURE 1 is shown in cutaway view. The apparatus has a rotating shaft 20 extending through the central portion thereof. The shaft is turned by motor 21. A plurality of stirring rods 22, having wipers 23 extending downwardly, are attached to shaft 20. As the shaft rotates, the wipers continuously wipe the material from the fractionator tray 24. Fractionator trays 24 are provided with large holes so that the polymer can easily flow downwardly in the column.

Referring now to FIGURE 3, there is shown an apparatus which is a modification of the apparatus shown in FIGURE 2. In this apparatus, a plurality of fractionator trays 30 are provided with weirs 31 at the outer periphery thereof. The fractionator trays are open at the periphery to allow some of the slurry to continuously flow over the weir 31 and down the column. The fractionator tray also has holes or slots for vapor-liquid contact.

As a specific example of how the invention works, the following is a material balance in pounds per stream day of an ethylene-propylene polymerization carried out on the apparatus described in FIGURE 1.

| Stream No | 2 | 12+13 | 3 | 15 |
|---|---|---|---|---|
| Ethylene | 9,000 | | | |
| Ethane | 1,000 | | | 1,000 |
| Propane | | 7,571 | | 7,571 |
| Propylene | | 155,570 | | 104,130 |
| n-Pentane | | | 154 | 154 |
| Titanium trichloride | | | 46 | 46 |
| Diethylaluminum chloride | | | 36 | 36 |
| Soluble polymer | | | | 3,630 |
| Particulate polymer | | | | 56,810 |
| Total, Lb./Stream Day | 10,000 | 163,141 | 236 | 173,377 |

Although not a preferred embodiment, the invention can also apply to a plurality of reactors wherein ethylene and a diluent of lower vapor pressure, for example, is introduced into the first reactor, the effluent from the first reactor is passed to a second reactor where ethylene is flashed as a vapor and recycled to the first reactor, and from the second reactor to a third reactor. The rate and degree of polymerization decrease as the effluent is passed from the first reactor, to the second reactor, to the third reactor since monomer concentration decreases until finally no further polymerization of ethylene occurs in a reactor. The catalyst will flow concurrently with the effluent from the reactors. The overhead from the reactors can be cooled and passed back into the previous reactor. In the final reactor, propylene can be introduced under conditions which will cause the propylene to copolymerize in block form on the ethylene polymers. Each reactor thus performs the function of a tray in the previously described fractionator.

The size of the reaction column 1 can vary over a wide range. However, the size and conditions under which the column is operated should be such that the first polymerizable monomer is present as monomer in the upper zone only and the second polymerizable monomer is present in said column no higher than the second polymerizing zone. In other words, the first monomer is substantially absent in the lower polymerizing zone and the second monomer is substantially absent in the upper polymerizing zone.

Reasonable variation and modification are possible within the scope of the foregoing disclosure, the drawings and the appended claims to the invention, the essence of which is that a continuous block copolymerization process is carried out in a two zone reactor wherein as a first monomer is polymerized, it is moved to a second zone wherein a second monomer is added to the polymer formed in the first zone; and that there has been provided an apparatus for block copolymerizing a plurality of monomers wherein a fractional distillation zone contains a means for preventing polymer from accumulating on the fractionator trays.

I claim:
1. A continuous process for the production of a block copolymer comprising passing a first lighter monomer and diluent of lower vapor pressure than the first monomer to the upper portion of a polymerization zone wherein polymerization of the monomer takes place, removing an overhead gaseous stream, cooling said stream and returning the thus cooled stream to the upper portion of the polymerization zone, passing the thus polymerized monomer through a zone containing said diluent and essentially no monomer to the bottom portion of the polymerization zone wherein it is contacted with a second heavier monomer in the substantial absence of said first monomer under conditions such that the second monomer will add to the polymer formed in the upper portion of the reaction zone, and maintaining a temperature gradient such that the temperature increases from the top to the bottom of said reaction zone.

2. A process according to claim 1 wherein the heat of reaction in the upper portion of the reaction zone is controlled by removing the overhead comprising unpolymerized first monomer and diluent from the zone, cooling the overhead, and returning it to the upper portion of the zone.

3. A process according to claim 1 wherein the boil-up and primary monomer stripping in the bottom portion of the reaction zone is controlled by supplying a predetermined amount of vaporous secondary monomer to the bottom portion of the polymerization zone.

4. A process according to claim 1 wherein copolymer is continuously recovered from the bottom portion of the reaction zone.

5. A process according to claim 1 wherein said reaction zone is a fractional distillation zone and ethylene and ethane are passed to the upper portion of said zone and propylene is passed to the lower portion of said zone.

6. A process according to claim 5 wherein a catalyst suitable for polymerizing ethylene and suitable for polymerizing propylene onto ethylene polymers is introduced into the upper portion of said fractional distillation zone.

7. A process for the production of a block copolymer comprising: passing ethylene into the upper portion of a polymerization zone; introducing into said upper portion of said polymerization zone a catalyst comprising (a) a compound having the formula $R_nMX_m$, wherein R is a radical selected from the group consisting of alkyl, cycloalkyl, aryl, and combinations thereof, X is hydrogen or a halogen, M is aluminum, gallium, indium or thallium, $n$ is an integer from 1 to 3, $m$ is from 0 to 2 and the sum of $m$ and $n$ is equal to a valence of the metal M, and (b) a halide of a metal of Group IV–B, V–B, VI–B, or VIII; maintaining temperature conditions in said upper zone such that the ethylene will polymerize; removing an overhead gaseous stream, cooling and condensing said stream and returning said condensed stream to said upper portion of said reaction zone; passing said thus polymerized ethylene downwardly through a zone containing said ethane and essentially no monomer into a lower portion of said polymerization zone; introducing propylene into said lower portion; maintaining said lower portion at a sufficiently high temperature that said propylene will add to said polymerized ethylene; controlling boil-up of said propylene by adding condensed propylene to said lower portion of said polymerization zone; maintaining a temperature gradient such that the temperature increases from the top to the bottom of said reaction zone; and continuously recovering said block copolymer from said lower portion.

8. A process according to claim 7 wherein said compound (a) is diethylaluminum, said compound (b) is titanium tetrachloride, said temperature in said upper portion is about −10° F. and said temperature in said lower portion is about 130° F.

References Cited
UNITED STATES PATENTS

| 3,182,050 | 5/1965  | Irvin          | 260—95   |
| 3,193,360 | 7/1965  | Scoggin        | 260—95   |
| 3,318,976 | 5/1967  | Short          | 260—878  |
| 3,334,081 | 8/1967  | Madgwick et al.| 260—94.9 |
| 3,345,431 | 10/1967 | Harban         | 260—878  |
| 3,347,955 | 10/1967 | Renaudo        | 260—878  |

MURRAY TILLMAN, Primary Examiner

M. J. TULLY, Assistant Examiner

U.S. Cl. X.R.

23—283; 260—95